United States Patent [19]

Benedini et al.

[11] Patent Number: 4,529,568
[45] Date of Patent: Jul. 16, 1985

[54] SYSTEM FOR COATING WELDED PIPE JOINTS WITH WEIGHTING MATERIAL

[75] Inventors: Giorgio Benedini, S. Donato Milanese, Italy; Anthony E. J. Strange, Wilts, England

[73] Assignees: Saipem S.p.A., Milan, Italy; N.I.C.C. Limited, Cirencester Glos., Great Britain

[21] Appl. No.: 545,654

[22] Filed: Oct. 26, 1983

[30] Foreign Application Priority Data

Nov. 23, 1982 [IT] Italy ................................ 24371 A/82

[51] Int. Cl.³ .......................... B29G 7/00; B32B 31/06
[52] U.S. Cl. .................................... 264/262; 264/267; 422/135; 425/501
[58] Field of Search ...................... 264/46.7, 46.9, 261, 264/DIG. 7, 256, 262, 267; 425/501; 422/133, 135

[56] References Cited

U.S. PATENT DOCUMENTS

| | | | |
|---|---|---|---|
| 1,620,154 | 3/1927 | Furman | 264/261 X |
| 3,336,184 | 8/1967 | Stastny et al. | 264/DIG. 7 |
| 3,726,950 | 4/1973 | Turzillo | 264/256 X |
| 3,949,461 | 4/1976 | Thastrup | 264/46.9 X |

OTHER PUBLICATIONS

Brydson, J. A., *Plastics Materials*, Princeton, N.J., D. Van Nostrand, © 1966, p. 489.

*Primary Examiner*—Philip Anderson
*Attorney, Agent, or Firm*—Hedman, Gibson, Costigan & Hoare

[57] ABSTRACT

A system for coating a welded joint in butt-welded pipes, comprising the following stages: feeding a first component constituted by a mixture of modified polyurethane resins premixed with a high-density inert material of well defined particle size to the hopper of a screw feeder by way of a regulator valve which meters its throughput; conveying said first component in the form of a slurry by means of said screw feeder into a blade mixer where it is carefully mixed with a second component constituted by a liquid hardening catalyst in a suitable mixing proportion by means of a metering pump and by way of a heat exchanger; and finally filling a form surrounding said joint with the catalyzed mixture leaving said blade mixer.

4 Claims, 1 Drawing Figure

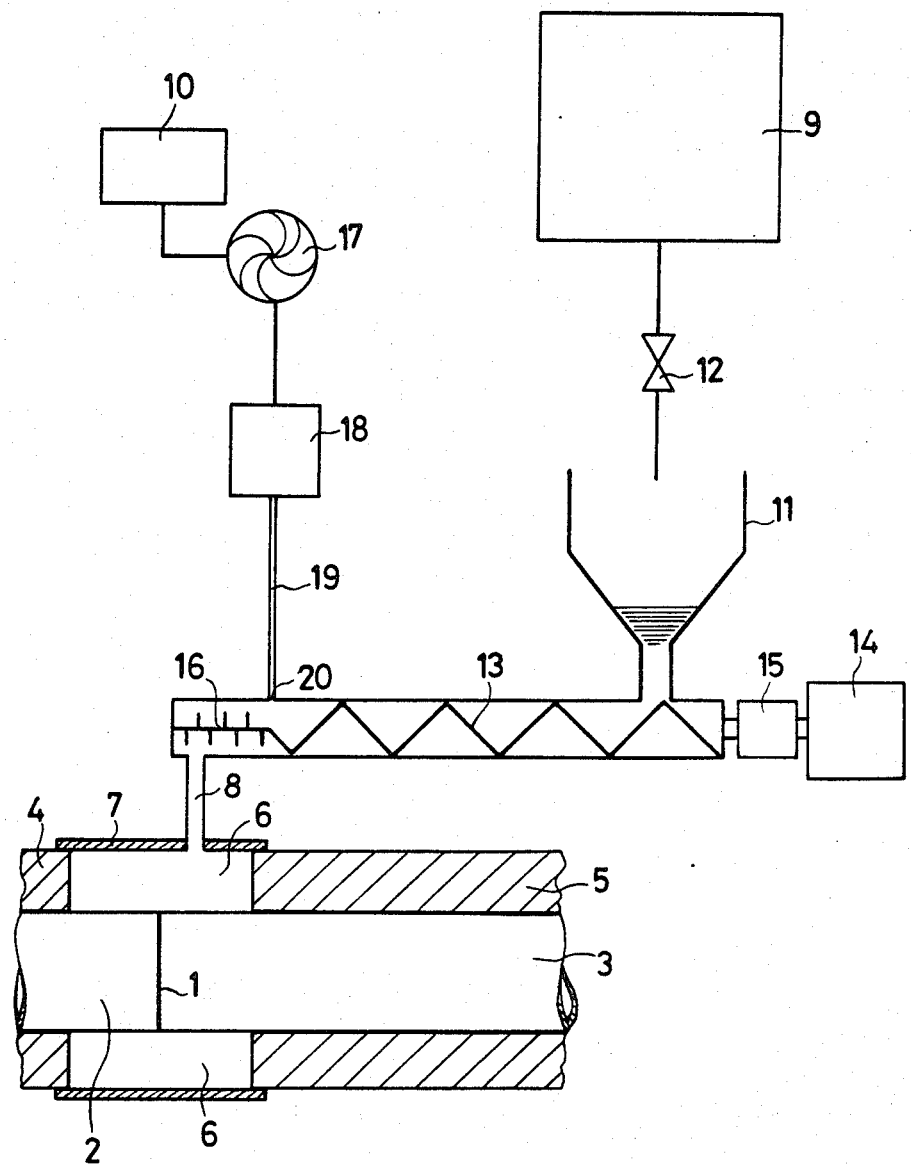

SYSTEM FOR COATING WELDED PIPE JOINTS WITH WEIGHTING MATERIAL

This invention relates to an improved system which enables welded pipe joints to be rapidly and effectively coated with weighting material.

The industry concerned with the laying of pipes in the sea currently uses a marine mastic composed of tar to which various inert materials (gravel, sand etc.) are added for coating joints over the part which is not covered by the pre-existing cement protection. This substance is placed in a boiler which melts it, and by way of a small hopper it is then cast by gravity into a sheet metal form which embraces the two ends of the weighting coating of two butt-welded pipes. The form is then closed, and subjected to forced cooling by spraying cold water around the form. Only when cooling is complete is it possible for that portion of jointed pipe to be moved and to pass without difficulty through the slide rollers which direct it towards its subsequent launching stage.

This known system has a series of drawbacks and disadvantages. In this respect, the need to constantly supply heat to the marine mastic and keep it stirred before casting requires the presence of a burner or boiler on the ship, this representing a serious fire hazard. The substance itself is then delivered at a temperature which is absolutely dangerous for the personnel. Moreover, the cooling stage requires an excessively lengthy time which thus considerably lengthens the cycle comprising the welding and launching of the pipe, with consequent negative influence on costs. Furthermore, the substances in question are of such a volume as to give rise to further expense by virtue of storage and transport costs, and also have low thermal conductivity which results in low compression resistance until their mass has completely cooled down. Finally, toxic fumes are produced.

The object of the present invention is to obviate the aforesaid drawbacks and defects, and to thus provide a new system which enables the coating of the joints, ie the filling of the uncovered portion at the butt joint between pipes, to be effected rapidly and effectively, and allows a final filling product to be obtained and easily dispensed, having a density which is even greater than the densities obtained up to the present time, thus providing effective and suitable weighting.

This is substantially attained by filling the removable metal form with a high-density filling material of high impact resistance constituted by a mixture of polymer resins and high-density inert material, which is injected and hardened as a two-component system.

More specifically, a mixture of polyhydroxy resins premixed with a high-density inert material of well defined particle size, generally iron oxide, to form a mixture in the form of a heavy slurry ready for use, and constituting the first component, the second component being a liquid polyisocyanate component which is added in a suitable proportion to the first component only at the moment of injection into the form.

This not only avoids any danger of blockages, which can easily occur because of the very short solidification time required by the product used, but it also makes it possible to easily vary the reactivity and properties of the weighting material by simply varying the ratio of the slurry to hardener or of the resin mixture to inert material on mixing.

On the other hand, in order to enable the hardener to effectively accomplish its action on its injection into the slurry, its viscosity must be neither too high nor too low, otherwise it would not be properly atomised and thus be imperfectly mixed with the resin mixture contained in the slurry. This viscosity must therefore be kept under constant control, and as it is inversely proportional to the temperature this is attained by a heat exchanger which regulates the hardener temperature before its injection into the slurry.

Thus, the system for coating a pipe weld joint with weighting material, consisting of filling a sheet metal form surrounding said joint with material, is characterised according to the present invention by comprising the following stages: feeding a first component constituted by a mixture of polyhydroxy resins premixed with a high-density inert material of well defined particle size to the hopper of a screw feeder by way of a regulator valve which meters its throughput; conveying said first component in the form of a slurry by means of said screw feeder into a blade mixer where it is carefully mixed with a second component constituted by a liquid polyisocyanate component which is injected in a suitable mixing proportion by means of a metering pump and by way of a heat exchanger which controls the temperature of said hardener; and finally filling said form with the catalysed mixture leaving said blade mixer.

According to a further characteristic of the present invention, said mixture of polyhydroxy resins comprises polyhydroxy polyether with an equivalent weight of 77, polyhydroxy polyether with an equivalent weight of 148, a surface-active silicone-based stabiliser, and a purified amino urethane catalyst. A further characteristic of the present invention is that said high-density inert material is a suitably pretreated iron oxide having a density of about 3800 kg/m$^3$.

Finally, according to a further characteristic of the present invention, said polyisocyanate component is a modified MDI with an equivalent weight of 140 and a free NCO content of 31. The advantages of such a system are immediately apparent. It is a cold, clean and economical system which by not requiring any boiler eliminates all pollution, danger and emission of toxic fumes.

There is also no need for forced cooling, the cooling occurring spontaneously in just a few minutes, ie in a much shorter time than that required for making a welded joint, thus obviating holdups and antieconomical idle times in the welding station. It therefore has high compression resistance after only a few minutes, and also allows a high injection rate, leading to rapid filling without voids.

It also allows effective pipe weighting in that densities of 3000 kg/m$^3$ and more can be attained, and also allows the density and thermal conductivity to be varied according to requirements. Finally, by allowing a high expansion ratio up to 20:1, it drastically reduces the storage costs of the two components of the system.

The invention is described hereinafter with reference to the accompanying drawing, which diagrammatically illustrates a preferred embodiment by way of non-limiting example only, in that technical and constructional modifications can be made thereto without leaving the scope of the present invention.

In said drawing, the reference numeral 1 indicates the butt welded joint between two pipes 2 and 3 provided with cement coatings 4 and 5 respectively, except in the annular zone 6 at the joint itself.

In order to coat said uncovered zone 6, a sheet metal form 7 is provided around the pipes, and rests on the ends of the coatings 4 and 5, weighting material then being fed into it through a conduit 8 until it is full.

Said weighting material is obtained, according to the invention, as the final product in the mixing of two separate components which are respectively stored in the storage vessels 9 and 10. The first component contained in the vessel 9 is a mixture of modified polyurethane resins premixed with a high-density inert material of well defined particle size. More specifically, said mixture comprises polyhydroxy polyether with an equivalent weight of 77, polyhydroxy polyether with an equivalent weight of 148, a surfaceactive silicone-based stabiliser and a purified amino urethane catalyst, and is itself mixed with suitably pretreated iron oxide of well defined particle size and with a density of about 3800 kg/m$^3$, so as to form a new mixture in the form of a heavy slurry.

The second component contained in the vessel 10 is a liquid polyisocyanate component. More specifically, it is a modified MDI with an equivalent weight of 140 and a free NCO content of 31.

The first component or slurry mixture is fed from the storage vessel 9 into the feed hopper 11 through the regulator valve 12, which regulates its throughput to the required value. By means of a screw feeder 13, driven by a motor 14 by way of a gearbox 15, said slurry is fed to a blade mixer 16 where it is mixed with said second hardening component.

This second component is withdrawn from the vessel 10 in a suitable quantity by means of the metering pump 17, and after passing through the heat exchanger 18, the purpose of which is to stabilise its temperature and thus its viscosity, it is fed through a thermally insulated feed pipe 19 to the atomiser 20, which injects it into the mass of said slurry at the inlet to the blade mixer 16. The catalysed mixture, ie the mixture of the two said components, undergoes thorough mixing by the combined effect of the longitudinal thrust created by the screw 13 and the rotation of the blades of the mixer 16, after which the final product is fed into said form 7.

We claim:

1. A process for coating a welded pipe joint with a modified urethane resin weighting material, consisting of filling a sheet metal form surrounding said joint with reactants to form said material, comprising the following steps:
    (a) feeding a first component comprising a mixture of polyhydroxy resins and a catalyst that have been premixed with a high-density inert material of well defined particle size to the hopper of a screw feeder through a regulator valve which meters its throughput;
    (b) conveying said first component in the form of a slurry by means of said screw feeder into a blade mixer;
    (c) mixing said slurry in said blade mixer with a second component comprising a liquid polyisocyanate components which has been injected therein in a suitable proportion for mixing by means of a metering pump, the temperature of said component being controlled by a heat exchanger through which the catalyst is passed prior to said mixing;
    (d) and finally filling said sheet metal form with the catalysed mixture from said blade mixer.

2. A process as claimed in claim 1, characterized in that said mixture of polyhydroxy resins comprises polyhydroxy polyether with an equivalent weight of 77, polyhydroxy polyether with an equivalent weight of 148, a surface-active silicone-based stabilizer, and a purified amino urethane catalyst.

3. A process as claimed in claim 1, characterized in that said high-density inert material is a suitably pretreated iron oxide having a density of about 3800 kg/m$^3$.

4. A process as claimed in claim 1, characterized in that said polyisocyanate component is a modified MDI with an equivalent weight of 140 and a free NCO content of 31.

* * * * *